US006956066B2

(12) United States Patent
Vazquez et al.

(10) Patent No.: US 6,956,066 B2
(45) Date of Patent: Oct. 18, 2005

(54) POLYIMIDE FOAMS

(75) Inventors: Juan M. Vazquez, Miami, FL (US); Roberto J. Cano, Yorktown, VA (US); Brian J. Jensen, Williamsburg, VA (US); Erik S. Weiser, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/779,552

(22) Filed: Feb. 11, 2004

(65) Prior Publication Data

US 2004/0249002 A1 Dec. 9, 2004

Related U.S. Application Data

(60) Provisional application No. 60/446,355, filed on Feb. 11, 2003.

(51) Int. Cl.$^7$ .................................................. C08J 9/04

(52) U.S. Cl. ........................ 521/50.1; 521/88; 521/119; 521/157; 521/153; 528/73; 528/59

(58) Field of Search ......................... 521/50.1, 88, 119, 521/157, 163; 528/73, 59

(56) References Cited

U.S. PATENT DOCUMENTS

| | | | | |
|---|---|---|---|---|
| 3,554,939 A | | 1/1971 | Lavin et al. | |
| 3,708,458 A | | 1/1973 | Alberino et al. | |
| 3,772,216 A | * | 11/1973 | Rosser et al. | 521/112 |
| 3,787,367 A | | 1/1974 | Farrissey et al. | |
| 3,966,652 A | | 6/1976 | Gagliani et al. | |
| 4,026,833 A | | 5/1977 | D'Alelio | |
| 4,177,333 A | * | 12/1979 | Riccitiello et al. | 521/124 |
| 4,184,021 A | | 1/1980 | Frosch et al. | |
| 4,305,796 A | | 12/1981 | Gagliani et al. | |
| 4,315,076 A | | 2/1982 | Gagliani et al. | |
| 4,315,077 A | | 2/1982 | Gagliani et al. | |
| 4,439,381 A | | 3/1984 | Gagliani et al. | |
| 4,535,099 A | | 8/1985 | Lee et al. | |
| 4,585,805 A | * | 4/1986 | Gagliani et al. | 521/129 |
| 4,738,990 A | | 4/1988 | Nelb, II et al. | |
| 4,900,761 A | | 2/1990 | Lee et al. | |
| 4,946,873 A | | 8/1990 | Carter et al. | |
| 5,077,318 A | | 12/1991 | Barringer et al. | |
| 5,122,546 A | | 6/1992 | Lee | |
| 5,298,531 A | | 3/1994 | Ishikura et al. | |
| 5,994,418 A | | 11/1999 | Weiser et al. | |
| 6,057,379 A | | 5/2000 | Choi et al. | |
| 6,084,000 A | | 7/2000 | Weiser et al. | |
| 6,133,330 A | | 10/2000 | Weiser et al. | |
| 6,172,127 B1 | | 1/2001 | Choi et al. | |
| 6,180,746 B1 | | 1/2001 | Weiser et al. | |
| 6,222,007 B1 | | 4/2001 | Cano et al. | |
| 6,235,803 B1 | | 5/2001 | Weiser et al. | |
| 2002/0002208 A1 | | 1/2002 | Martel et al. | |
| 2003/0065044 A1 | | 4/2003 | Ozawa et al. | |

FOREIGN PATENT DOCUMENTS

JP 10-81727 * 3/1998

* cited by examiner

*Primary Examiner*—James J. Seidleck
*Assistant Examiner*—Irina S. Zemel
(74) *Attorney, Agent, or Firm*—Robin W. Edwards

(57) ABSTRACT

A fully imidized, solvent-free polyimide foam having excellent mechanical, acoustic, thermal, and flame resistant properties is produced. A first solution is provided, which includes one or more aromatic dianhydrides or derivatives of aromatic dianhydrides, and may include one or more aromatic diamines, dissolved in one or more polar solvents, along with an effective amount of one or more blowing agents. This first solution may also advantageously include effective amounts respectively of one or mores catalysts, one or more surfactants, and one or more fire retardants. A second solution is also provided which includes one or more isocyanates. The first and second solutions are rapidly and thoroughly mixed to produce an admixture, which is allowed to foam—in an open container, or in a closed mold—under ambient conditions to completion produce a foamed product. This foamed product is then cured by high frequency electromagnetic radiation, thermal energy, or a combination thereof. Alternatively, the process is adapted for spraying or extrusion.

27 Claims, No Drawings

POLYIMIDE FOAMS

CROSS-REFERENCE TO RELATED APPLICATION

This application claims the benefit of U.S. Provisional Application Ser. No. 60/446,355, filed on Feb. 11, 2003.

STATEMENT REGARDING FEDERALLY SPONSORED RESEARCH OR DEVELOPMENT

The invention described herein was made in part by employees of the United States Government and may be manufactured and used by and for the Government of the United States for governmental purposes without the payment of any royalties thereon or therefore.

BACKGROUND OF THE INVENTION

1. Field of the Invention

This present invention relates generally to polyimides. It relates in particular to polyimide foams and a process for the preparation of polyimide foams for widespread applications in the aerospace, marine, automotive and building construction industries.

2. Description of the Related Art

Polyimide foams have a number of beneficial attributes for many applications. As a result, they are employed in joining metals to metals or metals to composite structures; as structural foam, having increased structural stiffness without large weight increases; and as low density insulation for thermal and acoustic applications.

Methods for making polyimide foams as disclosed in U.S. Pat. Nos. 5,298,531; 5,122,546; 5,077,318; and 4,900,761 utilize solutions of diamines and dianhydrides or dianhydride derivatives in a low molecular weight alkyl alcohol solvent. Polyimide precursor solutions and powders therefrom are then processed into foams through the expulsion of water and alcohol during a thermal imidization process. Unfortunately, foams prepared by these methods are not available in a wide range of densities, especially very low densities, along with the desired combination of mechanical properties and flame resistance. Moreover, thermal energy must be applied to the precursors to produce the foam, thereby limiting the applicability of the processes.

Polyimide foaming processes as disclosed in U.S. Pat. Nos. 4,738,990; 6,057,379; and 6,133,330 all employ powder precursors. As a result, these processes do not present the widest possible range of applicability, howsoever efficacious they might be.

Polyimide foaming processes as disclosed in U.S. Pat. Nos. 6,057,379 and 4,946,873, as well as U.S. Patent Application Publication 2003/0065044A1, all require the application of microwave radiation to initiate the foaming process. Such a requirement presents a significant limitation on the applicability of these processes.

BRIEF SUMMARY OF THE INVENTION

It is accordingly a primary object of the present invention to overcome difficulties and avoid inadequacies presented by related art processes for the production of polyimide foams. This object is achieved by employing the process of the present invention, which includes preparing a first solution of one or more aromatic dianhydrides or derivatives of aromatic dianhydrides in one or more polar solvents. This first solution additionally includes one or more blowing agents, and advantageously also one or more catalysts, one or more surfactants, and one or more fire retardants, and may also include one or more aromatic diamines. A second solution is provided, which includes one or more isocyanates. The first and second solution are then mixed rapidly and vigorously to produce an admixture, which is allowed to foam to completion under ambient conditions, without the application of external energy, to produce a foamed product. In one embodiment, the admixture is allowed to foam either in an open container or in a closed mold, and the low density, low-to-medium molecular weight foamed product produced thereby is then cured and polymerized to a high molecular weight product by exposure to high frequency electromagnetic radiation, such as microwave radiation, either alone or followed by thermal energy to finalize cure. Thermal energy may also be used exclusively to cure. In an alternative embodiment, the first and second solution are mixed in air within a mixing chamber of a spraying system, into which mixing chamber the first and second solutions are individually fed. The resulting admixture is then immediately sprayed by the spraying system onto the surface of an article, upon which it is allowed to foam to completion at ambient conditions, and is then cured. The first and second solutions can also be combined in a high speed mixer for subsequent extrusion.

The polyimide foams prepared by the process of the present invention have densities ranging from about 0.2 pounds per cubic foot to about 20 pounds per cubic foot. These foams have excellent mechanical, acoustic, thermal, and flame resistant properties including excellent compression rebound, and are therefore highly suitable as insulation materials.

Because the foam precursors are liquid in the present process, and because an input of energy is not required to form the foam, the process of the present invention is appropriate for a wider range of applications than related art processes. Moreover, high yields of foam are provided, with no significant amount of waste to be disposed of afterwards. Finally, the process of the present invention affords a much greater control over density, as well as open/closed cell content of the foam, as compared with prior art processes.

DETAILED DESCRIPTION OF THE INVENTION

According to the process of the present invention, a first solution is provided which is one or more aromatic dianhydrides or derivatives of aromatic dianhydrides, and may include one or more aromatic diamines, dissolved in one or more polar solvents, along with an effective amount of one or more blowing agents. The one or more aromatic dianhydrides are advantageously, but not limited to, pyromellitic dianhydyride (PMDA), or 3,3',4,4'-benzophenone tetracarboxylic dianhydride (BTDA), 4,4'-oxydiphthalic anhydride (ODPA), 3,3',4,4'biphenyl tetracarboxylic dianhydride (BPDA), and the polar solvents are desirably, but not limited to, N,N-dimethylformamide (DMF), or N,N-dimethylacetamide (DMAc), or N-methylpyrrolidinone (NMP). Effective blowing agents are water, methanol, ethanol, acetone, 2-butoxyethanol, ethyl glycol butyl ether (EB), ethylene glycol (E-600), halogen substituted organic compounds such as HCFC-141-B and HFC-245FA, which are available from Honeywell, triethylamine, and ethers such as tetrahydrofuran (THF). The aromatic diamines are advantageously, but not limited to, 4,4'oxydianline (4,4'ODA), 3,4'oxydianline (3,4'ODA), m-phenylenediamine (m-PDA), p-phenylenediamine (p-PDA), 1,3bis(3-aminophenoxy)benzene (3-APB), 4,4'diaminobenzophenone (4,4'DABP) and 4,4'diaminodiphenylsulphone (4,4'DDS). However, other similar materials may be employed as substitutes.

Highly beneficial results are achieved if the first solution also includes one or more catalysts such as an amine based catalyst or a metallic based catalyst. Suitable amine based catalysts are POLYCAT® 33, POLYCAT® 5, POLYCAT® BL 22, POLYCAT® LV 33, POLYCAT® 18 and DABCO® 8154 amine based catalysts, which are available from Air Products and Chemicals, Inc., as well as NIAX® A-33 amine based catalyst, which is available from O Si Specialities, Inc. A suitable metallic based catalyst is DABCO® K-15 metallic based catalyst, which is available from Air Products and Chemicals, Inc.

Excellent results are obtained if the first solution also includes an effective amount of one or more surfactants. Surfactants which have been employed with success are DC 193, DC 195, DC 197, DC 198, DC 5000 and DC 5598 surfactants, which are available from Dow Corning, as well as NIAX® L620 and NIAX® L-6900 surfactants, which are available from O Si Specialities, Inc.

It is also especially advantageous if the first solution also includes an effective amount of one or more fire retardants. Suitable fire retardants are ANTIBLAZE N, ANTIBLAZE 80, and VIRCOL® 82 fire retardants, which are all available from Rhodia.

According to the process of the present invention, a second solution is provided which includes one or more isocyanates. The one or more isocyanates may be monomeric organic isocyanates, polymeric organic isocyanates, or inorganic isocyanates. Isocyanates which have been beneficially employed are RUBINATE® M (polymeric, NCO content=31.5%, functionality=2.7); RUBINATE® TDI (NCO content=48.3%, functionality=2.0); toluene diisocyanate (TDI); methylene diisocyanate (MDI); PAPI® 94; and PAPI® 27, all of which are available from Huntsman Polyurethanes.

According to the present invention, the first and second solutions are combined at ambient temperature to produce an admixture, which is then allowed to foam to completion under ambient conditions to produce a foamed product, without the application of external energy in any form.

In one embodiment of the present process, the first and second solutions are thoroughly combined by stirring with a high speed mixer to product the admixture, and the admixture is allowed to foam to completion in an open container, or alternatively in a closed mold. Once the foaming has been completed, the low density, low-to-medium molecular weight foamed product from the open container or the closed mold is then cured and polymerized to a high molecular weight product by exposure to high frequency electromagnetic radiation, advantageously microwave radiation, either alone or followed by thermal energy to finalize cure. Thermal energy may also be used exclusively to cure. Hereby the foamed product is cured from the inside thereof outwardly, allowing evolution of volatiles from interior areas of the foamed product, instead of entrapment of the volatiles therein by an outer rind. If desired, the cured foamed product can be post cured by exposure thereof to thermal energy, whereby the cured foamed product is post cured from the outside thereof inwardly.

In another embodiment of the present process, the first and second solutions are thoroughly combined within a mixing chamber of a spraying system, into which mixing chamber the first and second solutions are individually fed. The resulting admixture is sprayed by the spraying system onto the surface of an article, upon which it is allowed to foam to completion. The first and second solutions can also be combined in a high speed mixer for subsequent extrusion.

EXAMPLES

The following examples are illustrative of the present invention, and are not intended to limit the ambit thereof. Densities specified are in accordance with ASTM D-3574A.

Example 1

One hundred sixty-eight (168) grams of pyromellitic dianhydride (PMDA) were dissolved in two hundred forty (240) grams of N,N-dimethyl formamide (DMF) at approximately 210° F. The solution was held at temperature and stirred until the PMDA was fully dissolved and the solution became clear. The solution was then cooled to approximately 175° F. Once cooled, twenty (20) grams of methanol were added to the solution and stirred. The addition of the methanol produced an exothermic reaction, which increased the temperature of the solution by approximately 25° F. This solution was again cooled, this time to approximately 120° F. A second solution consisting of twenty (20) grams of water, thirty-four (34) grams of surfactant (DC 193), 0.06 grams of DABCO® K-15 catalyst, 0.03 grams of POLYCAT® BL 22 catalyst, 12.5 grams of ethylene glycol (E-600), and 8.6 grams of ANTIBLAZE N phosphorus based fire retardant, was prepared concurrently.

This second solution was stirred at room temperature. This second, room temperature solution was poured into the 120° F. DMF solution and the mixture was stirred for several minutes. The combined solution was again cooled, this time to approximately 100° F. Once cool, 27.4 grams of RUBINATE® M isocyanate was added to 48.4 grams of the DMF solution. The remainder of the DMF solution was cooled to room temperature and stored for later use and given the designation 030403. The combined DMF solution and RUBINATE® M mixture was vigorously stirred with a high speed mixer (about 2000 rpm) for approximately 5–20 seconds. The contents, which began to rise/foam at this point, was immediately transferred to a Pyrex dish where it was allowed to rise at ambient conditions. Once the foam was no longer tacky and was somewhat rigid (about 10 minutes), it was placed in a conventional 1200-watt microwave oven and cured on high for nine minutes. The resultant foam was bright yellow in color and very tough with a density of 0.35 pcf. DSC measurements of the resultant foam indicated full imidization of the material.

Example 2

Two hundred forty-eight (248) grams of 3,3',4,4' bezophenone tetracarboxylic dianhydride (BTDA) were dissolved in two hundred forty (240) grams of N,N-dimethylformamide (DMF) at approximately 250° F. The solution was brought to a boil and stirred for approximately fifteen minutes. The partially dissolved solution was then cooled to approximately 180° F. Once cooled, twenty (20) grams of methanol were added to the solution and stirred. The addition of the methanol produced an exothermic reaction that increased the temperature of the solution by approximately 25° F. The addition of the methanol produced a fully dissolved, clear solution. This solution was again cooled, this time to approximately 120° F. A second solution consisting of twenty (20) grams of water, thirty-four (34) grams of surfactant (DC 193), 0.2 grams of DABCO® K-15 catalyst, 0.02 grams of POLYCAT® BL 22 catalyst, 12.5 grams of ethylene glycol (E-600), and 8.6 grams of ANTIBLAZE N phosphorous based fire retardant, was prepared concurrently. This second solution was stirred at room temperature. The second, room temperature solution was poured into the 120° F. DMF solution and stirred for several minutes. The combined solution was again cooled, this time to approximately 100° F. Once cool, 26.9 grams of RUBINATE® M isocyanate was added to 56.1 grams of the DMF solution. The remainder of the DMF solution was cooled to room temperature and stored for later use and given the designation B030303. The combined DMF solution and RUBINATE® M mixture was vigorously stirred with a high speed mixer (about 2000 rpm) for approximately 5–20 seconds. The contents, which began to rise/foam at this point, was immediately transferred to a Pyrex dish where it was allowed to rise at ambient conditions. Once the foam was no longer tacky and was somewhat rigid (about 10 minutes), it was placed in a conventional 1200-watt microwave oven and cured on high for nine minutes. The resultant foam was dark amber in color and very tough with a density of 0.35 pcf. DSC measurements of the resultant foam indicated full imidization of the material.

Example 3

Two hundred twenty-six (226) grams of 3,3',4,4'-biphenyltetracarboxylic dianhydride (BPDA) were dissolved in two hundred forty (240) grams of N,N-dimethylformamide (DMF) at approximately 250° F. The solution was brought to a boil and stirred for approximately fifteen minutes. The partially dissolved solution was then cooled to approximately 180° F. Once cooled, twenty (20) grams of methanol were added to the solution and stirred. The addition of the methanol produced a slight exothermic reaction that increased the temperature of the solution by approximately 10° F. However, in this case the addition of the methanol did not produce a fully dissolved, clear solution. The DMF/methanol mixture was again heated to 195° F. and stirred for an additional fifteen minutes. The BPDA did not completely dissolve and the resultant mixture was cloudy. The solution was then cooled to approximately 120° F. A second solution consisting of twenty (20) grams of water, thirty-four (34) grams of surfactant (DC 193), 0.04 grams of DABCO K-15 catalyst, 0.04 grams of POLYCAT® BL 22 catalyst, 12.5 grams of ethylene glycol (E-600), and 8.6 grams of ANTIBLAZE N phosphorous-based fire retardant, was prepared concurrently. This second solution was stirred at room temperature. The second, room temperature solution was poured into the 120° F. DMF mixture and stirred for several minutes. The combined solution was again cooled, this time to approximately 100° F. The combined mixture was cloudy white in color. Once cool, thirty (30) grams of RUBINATE® M isocyanate was added to forty-five (45) grams of the DMF solution. The remainder of the DMF solution was cooled to room temperature and stored for later use and given the designation BP03603. The combined DMF and RUBINATE® M mixture was vigorously stirred with a high speed mixer (about 2000 rpm) for approximately 5–20 seconds. The contents, which began to rise/foam at this point, was immediately transferred to a Pyrex dish where it was allowed to rise at ambient conditions. Once the foam was no longer tacky and was somewhat rigid (about 5 minutes), it was removed from the Pyrex dish and placed directly in a conventional 1200-watt microwave oven and cured on high for nine minutes. The resultant foam was dark yellow in color and somewhat brittle with a density of 0.94 pcf. DSC measurements of the resultant foam indicated full imidization of the material.

Example 4

An equal molar solution of pyromellitic dianhydride (PMDA) and 3,3',4,4'bezophenone tetracarboxylic dianhydride (BTDA) was prepared by mixing 24.7 grams of solution 030403 from Example 1 and 28 grams of solution B3030303 from Example 2. The mixture was stirred at room temperature for approximately five minutes. At room temperature, 27.4 grams of RUBINATE® M isocyanate was added to the 52.7 grams dianhydride mixture/DMF solution. This mixture was vigorously stirred with a high speed mixer (about 2000 rpm) for approximately 5–20 seconds. The contents, which began to rise/foam at this point, was immediately transferred to a Pyrex dish where it was allowed to rise at ambient conditions. Once the foam was no longer tacky and was somewhat rigid (about 10 minutes), it was removed from the Pyrex dish and placed directly in a conventional 1200-watt microwave oven and cured on high for nine minutes. The resultant foam was dark yellow in color and very tough with a density of 0.59 pcf. DSC measurement of the resultant foam indicated full imidization of the material.

Example 5

Eighty-four (84) grams of pyromellitic dianhydride (PMDA) were dissolved in one hundred twenty (120) grams of N,N-dimethylformamide (DMF) at approximately 210° F. The solution was held at temperature and stirred until the PMDA was fully dissolved and the solution became clear. The solution was then cooled to approximately 175° F. Once cooled, five (5) grams of methanol and five (5) grams of acetone were added and the solution was stirred. The addition of the methanol/acetone produced an exothermic reaction, which increased the temperature of the solution by approximately 15° F. This solution was cooled to approximately 120° F. A second solution consisting of ten (10) grams of water, seventeen (17) grams of surfactant (DC 193), 0.01 grams of DABCO K-15 catalyst, 0.01 grams of POLYCAT® BL 22 catalyst, 6.3 grams of glycol (E-600), and 4.3 grams of ANTIBLAZE N phosphorous based fire retardant, was prepared concurrently. This second solution was stirred at room temperature. This second, room temperature solution was poured into the 120° F. DMF solution and stirred for several minutes. The combined solution was again cooled, this time to approximately 100° F. Once cool, 27.4 grams of RUBINATE® M isocyanate was added to 48.4 grams of the DMF solution. The remainder of the DMF solution was cooled to room temperature and stored for later use and given the designation 032603a. The combined DMF solution and RUBINATE® M mixture was vigorously stirred with a high speed mixer (about 2000 rpm) for approximately 5–20 seconds. The contents, which began to rise/foam at this point, was immediately transferred to a Pyrex dish where it was allowed to rise at ambient conditions. Once the foam was no longer tacky and was somewhat rigid (about 10 minutes), it was placed in a conventional 1200-watt microwave oven and cured on high for nine minutes. The resultant foam was bright yellow in color and extremely tough with a density of 0.35 pcf. DSC measurements of the resultant foam indicated full imidization of the material.

Example 6

Thirty (30) grams of solution 030403 from Example 1 and twenty-one (21) grams of RUBINATE® M isocyanate were mixed together in a container at room temperature and vigorously stirred with a high speed mixer (about 2000 rpm) for approximately 5–20 seconds. The contents, which began to rise/foam at this point, was immediately transferred to a 473 ml closed ceramic mold where it was allowed to rise at ambient conditions. The foam was held in a closed mold at ambient conditions for approximately two and one half hours. (Approximately ten (10) grams of material squeezed out of the mold during the foaming process and six (6) grams were left in the mixing container.) At this point, the foamed product was removed from the mold and placed in a commercial 3000-watt microwave oven and cure at fifty (50) percent power for three minutes, followed by an additional three minutes at seventy (70) percent power, and then another three minutes at full power. The resultant foam of very good quality, dark yellow in color and tough with a density of 1.5 pcf. DSC measurements of the resultant foam indicated full imidization of the material.

Example 7

Flashing from the molding process from Example 6 that had been exposed to ambient conditions for approximately three hours was further compressed and then placed in a commercial 3000-watt microwave oven and cured at fifty (50) percent power for three minutes, followed by an additional three minutes at seventy (70) percent power, and then another three minutes at full power. The resultant foam was very hard, dark yellow in color and extremely tough with a density of approximately 8.3 pcf. DSC measurements of the resultant foam indicated full imidization of the material.

Example 8

A first solution comprising PMDA, DMF, methanol, water, surfactant DC 193, DABCO K-15 catalyst and POLYCAT® BL 22 catalyst, ethylene glycol (E-600), and ANTIBLAZE N phosphorous-based fire retardant, as generally set forth in Example 1 was prepared and placed in a fire storage tank. A second solution comprising methylene diisocyanate (MDI) was placed in a second storage tank. Two separate heatable hoses (capable of heating material flowing therethrough at a temperature of 200–250° F.) were individually attached to the first and second storage tanks on first ends thereof, from which the first and second solutions were drawn by a pressure differential and transferred therethrough to a mixing chamber of a spraying system connected to the other ends of the heatable hoses. The first and second solutions were mixed in the air contained within the mixing chamber of the spraying system and applied at a pressure of 1200 psi–1800 psi onto a article, whereupon they began to foam. The resulting exothermic reaction increased the temperature to a value high enough to cure the resulting foamed material. Hereby an article such as a marine vessel fuel tank is effectively protected. Moreover, any other intrinsic shape can be fully covered by foam and protected according to this embodiment of the present invention.

Example 9

Two hundred forty (240) grams of N,N-dimethyl formamide (DMF) was placed in a container. To the DMF was added twenty (20) grams of methanol, twenty (20) grams of water, thirty-four (34) grams of surfactant (DC 193), 0.06 grams of DABCO K-15 catalyst, 0.03 grams of POLYCAT BL 22 catalyst, 12.5 grams of ethylene glycol (E-600), and 8.6 grams of ANTIBLAZE N phosphorous-based fire retardant. Once the solution had been mixed thoroughly, one hundred sixty eight (168) grams of pyromellitic dianhydride (PMDA) was added and an exothermic reaction occurred, raising the temperature of the solution by approximately 50° F. The solution was allowed to cool to approximately 100° F. Once cool, 27.4 grams of RUBINATE® M isocyanate was added to 48.4 grams of the DMF solution. The remainder of the DMF solution was cooled to room temperature and stored for later use and given the designation 1-pot method. The combined DMF solution and RUBINATE® M mixture was vigorously stirred with a high-speed mixer (about 2000 rpm) for approximately 5–20 seconds. The contents, which begin to rise/foam at this point, were immediately transferred to a Pyrex dish where it was allowed to rise at ambient conditions. Once the foam was no longer tacky and was somewhat rigid (about 10 minutes), it was placed in a conventional 1200-watt microwave oven and cured on high for nine minutes. The resultant foam was bright yellow in color and very tough with a density of 0.39 pcf. DSC measurements of the resultant foam indicated full imidization of the material.

Example 10

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, 120 grams of N,N-dimethyl formamide (DMF), and 0.05 grams of AS-102 catalyst was prepared and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was given the designation of Part B. Once cool, 132.6 grams of RUBINATE® M isocyanate, given the designation Part A, was added to the solution. The Part B/Part A mixture was vigorously stirred with a high-speed mixer for approximately 5–20 seconds. The contents, which begin to rise/foam at this point, was immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of 0.34 pcf. Tables 1 and 2 display variations to Example 10 and the resultant change to the final foam density, with Table 1 displaying the variations in weight corresponding to the % variations in Table 2. The components that were varied are underlined. Thermal conductivity was measured by ASTM C-518 to be 0.334 Btu-in/hr-$ft^2$-° F. at room temperature.

TABLE 1

| EXAMPLE | PART B (grams) | | | | | | | | | SOLUTION | PART A (g) |
|---|---|---|---|---|---|---|---|---|---|---|---|
| NUMBER | PMDA | DMF | METH | EB | DC193 | ANTIBLAZE | E600 | H2O | AS-102 | TEMPERATURE | MDI[1] |
| 10 | 120 | 120 | 12 | 6.7 | 18 | 4.1 | 9.2 | 10.5 | 0.5 | 98° F. | 136.1 |
| 10-A | 120 | 120 | 12 | 6.7 | 18 | 4.1 | 9.2 | 10.5 | 0.5 | 98° F. | 149.7 |

TABLE 1-continued

| EXAMPLE | PART B (grams) | | | | | | | | | SOLUTION | PART A (g) |
|---|---|---|---|---|---|---|---|---|---|---|---|
| NUMBER | PMDA | DMF | METH | EB | DC193 | ANTIBLAZE | E600 | H2O | AS-102 | TEMPERATURE | MDI[1] |
| 10-B | 120 | 120 | 12 | 6.7 | 18 | 4.1 | 9.2 | 10.5 | 0.5 | 98° F. | 163.3 |
| 10-C | 120 | 120 | 12 | 6.7 | 18 | 4.1 | 9.2 | 10.5 | 0.5 | 98° F. | 122.5 |
| 10-D | 120 | 120 | 12 | 6.7 | 18 | 4.1 | 9.2 | 11.6 | 0.5 | 98° F. | 133.1 |
| 10-E | 120 | 120 | 12 | 6.7 | 18 | 4.1 | 9.2 | 9.5 | 0.5 | 98° F. | 132.2 |
| 10-F | 120 | 120 | 12 | 6.7 | 18 | 4.1 | 9.2 | 10.5 | 0.5 | 108° F. | 132.6 |
| 10-G | 120 | 120 | 12 | 6.7 | 18 | 4.1 | 9.2 | 10.5 | 0.5 | 88° F. | 132.6 |

[1]MDI = Rubinate M

TABLE 2

| EX-AMPLE NUMBER | PART B (wt %) PMDA | DMF | METH | EB | DC193 | ANTI-BLAZE | E600 | H2O | AS-102 | SOLUTION TEMPER-ATURE | Ratio PART B/A[2] | RESULTANT FOAM CHARACTERISTICS |
|---|---|---|---|---|---|---|---|---|---|---|---|---|
| 10 | 39.9 | 39.9 | 3.99 | 2.23 | 5.98 | 1.36 | 3.06 | 3.49 | 0.17 | 98° F. | 2.21 | Excellent Foam with a Density of 0.34 pcf |
| 10-A | 39.9 | 39.9 | 3.99 | 2.23 | 5.98 | 1.36 | 3.06 | 3.49 | 0.17 | 98° F. | 2.01 | Density Decreased to 0.3 pcf |
| 10-B | 39.9 | 39.9 | 3.99 | 2.23 | 5.98 | 1.36 | 3.06 | 3.49 | 0.17 | 98° F. | 1.84 | Density Decreased to 0.28 pcf and foam was Rigid |
| 10-C | 39.9 | 39.9 | 3.99 | 2.23 | 5.98 | 1.36 | 3.06 | 3.49 | 0.17 | 98° F. | 2.46 | Density Increased to 0.37 pcf and foam was flexible |
| 10-D | 39.7 | 39.7 | 3.97 | 2.22 | 5.96 | 1.36 | 3.05 | 3.84 | 0.17 | 98° F. | 2.27 | Density Decreased to 0.3 pcf and Foam had Large Cells |
| 10-E | 40.0 | 40.0 | 4.00 | 2.23 | 6.00 | 1.37 | 3.07 | 3.17 | 0.17 | 98° F. | 2.27 | Density Increased to 0.4 pcf |
| 10-F | 39.9 | 39.9 | 3.99 | 2.23 | 5.98 | 1.36 | 3.06 | 3.49 | 0.17 | 108° F. | 2.27 | Extremely Fast Reaction and Foam was Very Rigid |
| 10-G | 39.9 | 39.9 | 3.99 | 2.23 | 5.98 | 1.36 | 3.06 | 3.49 | 0.17 | 88° F. | 2.27 | Density Increased Slightly to 0.36 pcf |

[2]Part A = Rubinate M

Example 11

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, and 0.5 grams of catalyst (AS-102), was prepared and stirred at room temperature. A second solution consisting of 120 grams of N,N-dimethyl formamide (DMF) and 2 grams of 4,4'-oxydianline (ODA) was also prepared at room temperature. The first methanol solution was then added to the second DMF solution and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was given the designation of Part B. Once cool, 133.5 grams of RUBINATE® M isocyanate, given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of 0.40 pcf. Thermal conductivity was measure by ASTM C-518 to be 0.269 Btu-in/hr-ft$^2$-° F. at room temperature.

Example 12

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, and 0.5 grams of AS-102 catalyst was prepared and stirred at room temperature. A second solution consisting of 120 grams of N,N-dimethyl formamide (DMF) and 8 grams of 4,4'-oxydianline (ODA) was also prepared at room temperature. The first methanol solution was then added to the second DMF solution and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was given the designation of Part B. Once cool, 136.1 grams of RUBINATE® M isocyanate, given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of 0.51 pcf.

Examples 12A–12P

Other polyimide foams were made by varying the component contents of Example 12. Tables 3 and 4 display variations to Example 12. The weight percentages of each component of Part A and the B/A mix ratios are shown in Table 4. The components that were varied are underlined. Table 4 also provides a brief description of the final foam product. For Examples 12-A through 12-N in Tables 3 and 4, the procedures illustrated in Example 12 were followed. Only the amounts of various components were varied. For Examples 12-O and 12-P, the component contents of Example 12 were used, but the temperature of Part B was varied prior to the addition of Part A. All examples resulted in foams of varying quality and properties.

TABLE 3

| EXAMPLE | PART B (grams) | | | | | | | | | | SOLUTION | PART A (g) |
|---|---|---|---|---|---|---|---|---|---|---|---|---|
| NUMBER | PMDA | DMF | METH | EB | DC193 | ANTIBLAZE | E600 | H2O | AS-102 | 4,4' ODA | TEMPERATURE | MDI[3] |
| 12 | 120 | 120 | 12 | 6.7 | 18 | 4.1 | 9.2 | 10.5 | 0.5 | 8 | 98° F. | 136.1 |
| 12-A | 120 | 120 | 12 | 6.7 | 18 | 4.1 | 9.2 | 10.5 | 0.5 | 8 | 98° F. | 149.7 |
| 12-B | 120 | 120 | 12 | 6.7 | 18 | 4.1 | 9.2 | 10.5 | 0.5 | 8 | 98° F. | 163.3 |
| 12-C | 120 | 120 | 12 | 6.7 | 18 | 4.1 | 9.2 | 10.5 | 0.5 | 8 | 98° F. | 122.5 |
| 12-D | 120 | 132 | 12 | 6.7 | 18 | 4.1 | 9.2 | 10.5 | 0.5 | 8 | 98° F. | 141.4 |
| 12-E | 120 | 108 | 12 | 6.7 | 18 | 4.1 | 9.2 | 10.5 | 0.5 | 8 | 98° F. | 130.8 |
| 12-F | 120 | 120 | 13.2 | 6.7 | 18 | 4.1 | 9.2 | 10.5 | 0.5 | 8 | 98° F. | 136.7 |
| 12-G | 120 | 120 | 14.4 | 6.7 | 18 | 4.1 | 9.2 | 10.5 | 0.5 | 8 | 98° F. | 137.2 |
| 12-H | 120 | 120 | 10.8 | 6.7 | 18 | 4.1 | 9.2 | 10.5 | 0.5 | 8 | 98° F. | 135.6 |
| 12-I | 120 | 120 | 12 | 6.7 | 18 | 4.1 | 10.1 | 10.5 | 0.5 | 8 | 98° F. | 136.5 |
| 12-J | 120 | 120 | 12 | 6.7 | 18 | 4.1 | 8.3 | 10.5 | 0.5 | 8 | 98° F. | 135.7 |
| 12-K | 120 | 120 | 12 | 6.7 | 18 | 4.1 | 9.2 | 11.6 | 0.5 | 8 | 98° F. | 136.6 |
| 12-L | 120 | 120 | 12 | 6.7 | 18 | 4.1 | 9.2 | 9.5 | 0.5 | 8 | 98° F. | 135.7 |
| 12-M | 120 | 120 | 12 | 6.7 | 18 | 4.1 | 9.2 | 10.5 | 0.5 | 10 | 98° F. | 137.0 |
| 12-N | 120 | 120 | 12 | 6.7 | 18 | 4.1 | 9.2 | 10.5 | 0.5 | 6 | 98° F. | 135.2 |
| 12-O | 120 | 120 | 12 | 6.7 | 18 | 4.1 | 9.2 | 10.5 | 0.5 | 8 | 108° F. | 136.1 |
| 12-P | 120 | 120 | 12 | 6.7 | 18 | 4.1 | 9.2 | 10.5 | 0.5 | 8 | 88° F. | 136.1 |

[3]MDI = Rubinate M

TABLE 4

| EX- | PART B (wt %) | | | | | | | | | | SOLUTION | Ratio | |
|---|---|---|---|---|---|---|---|---|---|---|---|---|---|
| AMPLE NUMBER | PMDA | DMF | METH | EB | DC193 | ANTI-BLAZE | E600 | H2O | AS-102 | 4,4' ODA | TEMPER-ATURE | Part B/A[4] | RESULTANT FOAM CHARACTERISTICS |
| 12 | 38.8 | 38.8 | 3.88 | 2.17 | 5.83 | 1.33 | 2.98 | 3.40 | 0.16 | 2.59 | 98° F. | 2.27 | Excellent Foam with a Density of 0.51 pcf |
| 12-A | 38.8 | 38.8 | 3.88 | 2.17 | 5.83 | 1.33 | 2.98 | 3.40 | 0.16 | 2.59 | 98° F. | 2.06 | Density Decreased to 0.47 pcf |
| 12-B | 38.8 | 38.8 | 3.88 | 2.17 | 5.83 | 1.33 | 2.98 | 3.40 | 0.16 | 2.59 | 98° F. | 1.89 | Density Decreased to 0.45 pcf and foam was Rigid |
| 12-C | 38.8 | 38.8 | 3.88 | 2.17 | 5.83 | 1.33 | 2.98 | 3.40 | 0.16 | 2.59 | 98° F. | 2.52 | Density Increased to 0.54 pcf and foam was flexible |
| 12-D | 37.4 | 41.1 | 3.74 | 2.09 | 5.61 | 1.28 | 2.87 | 3.27 | 0.16 | 2.49 | 98° F. | 2.27 | Density Increased to 0.69 pcf and the Foam was Less Flexible |
| 12-E | 40.4 | 36.4 | 4.04 | 2.26 | 6.06 | 1.38 | 3.10 | 3.54 | 0.17 | 2.69 | 98° F. | 2.27 | Very Dense, Liquid Mass, Difficult to Mix |
| 12-F | 38.7 | 38.7 | 4.26 | 2.16 | 5.80 | 1.32 | 2.97 | 3.38 | 0.16 | 2.58 | 98° F. | 2.27 | Density Decreased to 0.45 pcf |
| 12-G | 38.5 | 38.5 | 4.62 | 2.15 | 5.78 | 1.32 | 2.95 | 3.37 | 0.16 | 2.57 | 98° F. | 2.27 | Foam Collapsed |
| 12-H | 39.0 | 39.0 | 3.51 | 2.18 | 5.85 | 1.33 | 2.99 | 3.41 | 0.16 | 2.60 | 98° F. | 2.27 | Open Cells Present |
| 12-I | 38.7 | 38.7 | 3.87 | 2.16 | 5.81 | 1.32 | 3.26 | 3.39 | 0.16 | 2.58 | 98° F. | 2.27 | Flexible Mass, Slight Increase In Density to 0.54 pcf |
| 12-J | 38.9 | 38.9 | 3.89 | 2.17 | 5.84 | 1.33 | 2.69 | 3.41 | 0.16 | 2.60 | 98° F. | 2.27 | Rigid Cells |
| 12-K | 38.7 | 38.7 | 3.87 | 2.16 | 5.80 | 1.32 | 2.97 | 3.74 | 0.16 | 2.58 | 98° F. | 2.27 | Density Decreased to 0.47 pcf and Foam had Large Cells |
| 12-L | 39.0 | 39.0 | 3.90 | 2.18 | 5.84 | 1.33 | 2.99 | 3.08 | 0.16 | 2.60 | 98° F. | 2.27 | Density Increased to 0.58 pcf |
| 12-M | 38.6 | 38.6 | 3.86 | 2.15 | 5.79 | 1.32 | 2.96 | 3.38 | 0.16 | 3.22 | 98° F. | 2.27 | Density Increased to 0.68 pcf |
| 12-N | 39.1 | 39.1 | 3.91 | 2.18 | 5.86 | 1.34 | 3.00 | 3.42 | 0.16 | 1.95 | 98° F. | 2.27 | Density Decreased to .45 pcf |
| 12-O | 38.8 | 38.8 | 3.88 | 2.17 | 5.83 | 1.33 | 2.98 | 3.40 | 0.16 | 2.59 | 108° F. | 2.27 | Extremely Fast Reaction, Unreacted Material Present, Rigid |
| 12-P | 38.8 | 38.8 | 3.88 | 2.17 | 5.83 | 1.33 | 2.98 | 3.40 | 0.16 | 2.59 | 88° F. | 2.27 | Low Growth and Density Increase to 0.6 pcf |

[4]Part A = Rubinate M

Example 13

A solution consisting of twelve (12) grams of methanol, 6.7 grams of ethyl glycol butyl ether (EB), 18 grams of surfactant (DC 193), 4.1 grams of ANTIBLAZE N phophorous based fire retardant, 9.2 grams of ethylene glycol (E-600), 10.5 grams of water, and 0.5 grams of AS-102 catalyst was prepared stirred at room temperature. A second solution consisting of 120 grams of N,N-dimethyl formamide (DMF) and 8 grams of 4,4'-oxydianline (ODA) was also prepared at room temperature. The first methanol solution was then added to the second DMF solution and stirred at room temperature. Then, 161 grams of 3,3',4,4'-biphenyltetracarboxylic dianhydride (BPDA) was slowly added to this combined solution. The addition of the BPDA into the solution was controlled such that the resultant exothermic reaction did not cause the solution temperature to exceed 190° F. A temperature of about 190° F. was maintained during the stirring of the solution and the addition of BPDA. Once combined, the resultant solution was cooled to approximately 98° F. This solution was given the designation of Part B. Once cool, 154.2 grams of RUBINATE® M isocyanate, given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of approximately 0.48 pcf.

Example 14

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, and 0.5 grams of AS-102 catalyst was prepared and stirred at room temperature. A second solution consisting of 120 grams of N,N-dimethyl formamide (DMF) and 4.3 grams of m-phenylene diamine (m-PDA) was also prepared at room temperature. The first methanol solution was then added to the second DMF solution and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was given the designation of Part B. Once cool, 134.5 grams of RUBINATE® M isocyanate, given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of approximately 0.48 pcf.

Example 15

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, and 0.5 grams of AS-102 catalyst was prepared and stirred at room temperature. A second solution consisting of 120 grams of N,N-dimethyl formamide (DMF) and 8 grams of 4,4'-oxydianline (ODA) was also prepared at room temperature. The first methanol solution was then added to the second DMF solution and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was given the designation of Part B. Once cool, 89 grams of RUBINATE® TDI isocyanate, given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and cured. The resultant foam was bright yellow in color and very tough with a density of approximately 0.48 pcf.

Example 16

A solution consisting of twelve (12) grams of methanol, 6.7 grams of ethyl glycol butyl ether (EB), 18 grams of surfactant (DC 193), 4.1 grams of ANTIBLAZE N phosphorous based fire retardant, 9.2 grams of ethylene glycol (E-600), 10.5 grams of water, and 0.5 grams of AS-102 catalyst was prepared and stirred at room temperature. A second solution consisting of 120 grams of N,N-dimethyl formamide (DMF) and 8 grams of 4,4'-oxydianline (ODA) was also prepared at room temperature. The first methanol solution was then added to the second DMF solution and stirred at room temperature. Then, 120 grams of pyromellitic dianhydride (PMDA) was slowly added to this combined solution. The addition of the PMDA into the solution was controlled such that the resultant exothermic reaction did not cause the solution temperature to exceed 190° F. A temperature of about 190° F. was maintained during the stirring of the solution and the addition of PMDA. Once combined, the resultant solution was cooled to approximately 98° F. This solution was give the designation of Part B. Once cool, 128 grams of RUBINATE® 44 (pure methylene diisocyanate, MDI), given the designation Part A, was added to the solution. The Part B/Part A mixture was vigorously stirred with a high-speed mixer for approximately 5–20 seconds. The contents, which begin to rise/foam at this point, were immediately transferred to an open mold where it was allowed to rise at ambient conditions. Once the foam was no longer tacky and was somewhat rigid (about 10 minutes), it was placed in a commercial microwave oven and curd. The resultant foam was bright yellow in color and very tough with a density of approximately 0.48 pcf.

The foamed products prepared according to the embodiments described above display outstanding flame resistance and very low smoke production properties. Moreover, when these foams are placed in contact with a flame, they do not burn, but emit only a minimal amount of smoke. The foams retain their shape and barely shrink after being subjected to high flame temperatures. In addition to the applications detailed above, the polyimide foams prepared according to the present invention can be placed inside the hull of a ship and secured between the bulkheads. Furthermore, foamed material can be cut to size after final curing and firmly adhered to an article such as a marine vessel fuel tank by means of a wrapping system, adhesive or mechanical attachment.

What is claimed is:

1. A process for producing an aromatic polyimide foam, which process comprises:

(a) providing a first solution comprising one or more aromatic dianhydrides or derivatives of aromatic dianhydrides dissolved in one or more polar solvents, along with an effective amount of one or more blowing agents;

(b) providing a second solution comprising one or more isocyanates;

(c) mixing the first and second solutions under ambient conditions to produce an admixture;

(d) allowing the admixture to foam to completion under ambient conditions to produce a foamed product; and (e) curing the foamed product.

2. The process of claim 1, wherein step (e) comprises exposing the foamed product to high frequency electromagetic radiation, whereby the foamed product is cured from the inside thereof outwardly, allowing evolution of volatiles from interior areas of the foamed product, instead of entrapment of the volatiles therein by an outer rind.

3. The process of claim 2, additionally comprising exposure to thermal energy to finalize cure.

4. The process of claim 1, wherein step (e) comprises exposing the foamed product to thermal energy.

5. The process of claim 1, wherein the first solution of step (a) additionally comprises an effective amount of one or more aromatic diamines.

6. The process of claim 1, which comprises the following additional step:

(f) post curing the cured foamed product by exposing the cured foamed product to thermal energy, whereby the cured foamed product is post cured from the outside thereof inwardly.

7. The process of claim 1, wherein the first solution of step (a) additionally comprises an effective amount of one or more catalysts.

8. The process of claim 7, wherein the one or more catalysts is one or more members selected from the group consisting of amine based catalyst and metallic based catalyst.

9. The process of claim 1, wherein the first solution of step (a) additionally comprises an effective amount of one or more surfactants.

10. The process of claim 1, wherein the first solution of step (a) additionally comprises an effective amount of one or more fire retardants.

11. The process of claim 1, wherein the one or more aromatic dianhydrides is one or more members selected from the group consisting of pyromellitic dianhydride; 3,3',4,4'-bezophenone tetracarboxylic dianhydride; 4,4'-oxydiphthalic anhydride; and 3,3',4,4'biphenyl tetracarboxylic dianhydride.

12. The process of claim 1, wherein the one or more polar solvents is one or more members selected from the group consisting of N,N-dimethylformamide; N,N-dimethylacetamide; and N-methylpyrrolidinone.

13. The process of claim 1, wherein the one or more blowing agents is one or more members selected from the group consisting of water, methanol, ethanol, acetone, 2-butoxyethanol, ethyl glycol butyl ether, ethylene glycol, halogen substituted organic compound, and ether.

14. The process of claim 13, wherein the ether is a member selected from the group consisting of tetrahydrofuran.

15. The process of claim 1, wherein the one or more isocyanates is one or more members selected from the group consisting of monomeric organic isocyanate, polymeric organic isocyanate, and inorganic isocyanate.

16. The process of claim 1, wherein the one or more aromatic diamines is one or more members selected from the group consisting of 4,4'oxydianline; 3,4'oxydianline; m-phenylenediamine; p-phenylenediamine; 1,3bis(3-aminophenoxy)benzene; 4,4'diaminobenzophenone; and 4,4'diaminodiphenylsulphone.

17. The process of claim 1, wherein the first and second solutions are thoroughly combined by stirring with a high speed mixer.

18. The process of claim 6, wherein the first and second solutions are thoroughly combined by stirring with a high speed mixer.

19. The process of claim 1, wherein the first and second solutions are thoroughly combined by stirring with a high speed mixer for about 5–20 seconds.

20. The process of claim 6, wherein the first and second solutions are thoroughly combined by stirring with a high speed mixer for about 5–20 seconds.

21. The process of claim 17, wherein the foamed product is cured in step (e) by exposing the foamed product to microwave radiation.

22. The process of claim 18, wherein the foamed product is cured in step (e) by exposing the foamed product to microwave radiation.

23. The process of claim 19, wherein the foamed product is cured in step (e) by exposing the foamed product to microwave radiation.

24. The process of claim 1, wherein the admixture from step (c) is allowed to foam to completion in an open container in step (d).

25. The process of claim 1, wherein the admixture from step (c) is immediately transit to a closed mold, wherein it is allowed to foam to completion in step (d), whereupon the foamed product is removed from the mold, and the foamed product is then cured by exposure to microwave radiation in step (e).

26. The process of claim 1, wherein the first and second solutions are mixed in step (c) in air within a chamber of a spraying system, into which mixing chamber the first and second solutions are individually fed, whereupon the resulting admixture of step (c) is sprayed by the spraying system onto the surface of an article, upon which it is allowed to foam to completion in step (d).

27. The process of claim 1, wherein the first and second solutions are mixed in step (c) in air within a high speed mixer, into which mixer the first and second solutions are individually fed, whereupon the resulting admixture of step (c) is extruded onto the surface of an article, upon which it is allowed to foam to completion in step (d).

* * * * *